July 24, 1928.

G. A. BENZ

SNAP FASTENER

Filed April 22, 1927

WITNESSES:

INVENTOR:
Gustav A. Benz,
BY
ATTORNEY.

Patented July 24, 1928.

1,678,240

UNITED STATES PATENT OFFICE.

GUSTAV A. BENZ, OF PHILADELPHIA, PENNSYLVANIA.

SNAP FASTENER.

Application filed April 22, 1927. Serial No. 185,705.

My invention relates to snap fasteners, such as are commonly used on garments, and has for its principal object to provide a snap fastener adapted to attach two articles or parts to one another and to hold same with greater tenacity than is possible with the employment of any snap fasteners now in use.

Another object of my invention is to provide a snap fastener that is separable only by a pull approximately at right angles to the axis of the fastener and which is not separable unless such pull is exerted.

Figure 1:
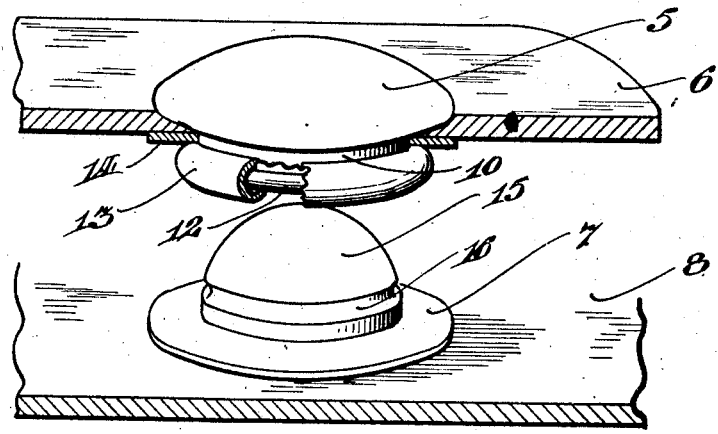

These objects, and other advantageous ends which will appear hereinafter, I attain in the following manner, reference being had to the accompanying drawing in which Figure 1 is a perspective view of an embodiment of my invention, the two parts being separated and the upper part being partly broken away and partly shown in section in order to illustrate certain construction.

Figure 2:
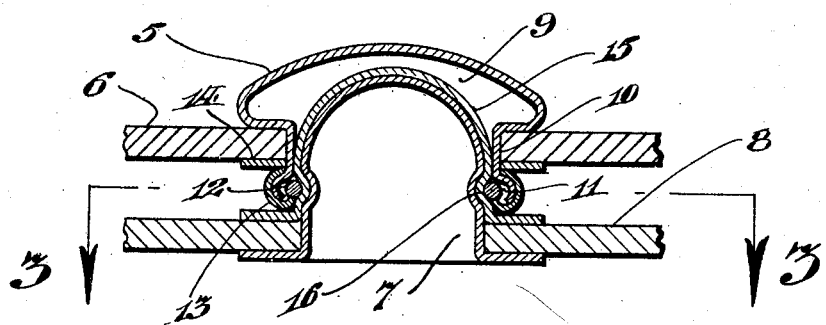
Figure 3:
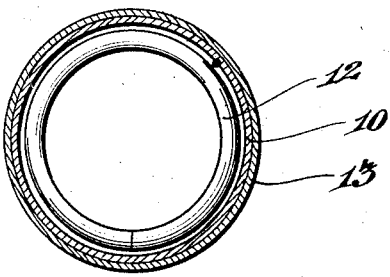

Figure 2 is a central vertical sectional view through the fastener shown in Figure 1 but showing the parts in operative position, and Figure 3 a section through the upper part of the fastener only, taken substantially on line 3—3 on Figure 2.

Referring more in detail to the drawing, the socket member 5 is shown secured to a piece of material 6 and the stud 7 secured to a piece of material 8. Stud 7 consists of inner and outer shells pressed together and having flanges engaging each side of material 8 in the manner well known in the art.

The top 9, forming a part of socket member 5, has a shank 10 which extends through material 6 and which is expanded to form an annular channel 11 after shank 10 has been inserted through a suitable aperture in material 6. A split ring 12, made of spring metal, is deposited in channel 11 and a spring retainer 13 shaped over the sides of the expanded portion of shank 10 in order to hold ring 12 therein. A washer 14 is slipped over shank 10 before channel 11 is formed and is adapted to be firmly pressed against the under side of material 6 by retainer 13, thus firmly securing socket member 5 to material 6.

Stud 7 has a dome-shaped part 15 with an annular groove 16 formed near its base which is adapted to receive ring 12. The opening in retainer 13 and the inside of shank 10 is but slightly larger than the greatest diameter of dome 15 but smaller than the outside diameter of ring 12; the diameter of channel 11 is slightly larger than the outside diameter of ring 12, while the inside diameter of ring 12 corresponds to the diameter of stud 7 at the bottom of groove 16.

As dome 15 enters the opening in retainer 13, its sloping surface will engage the inner edge of ring 12 and force same outwardly until it has passed over the widest part of the dome, after which it will engage groove 16 due to the inherent resiliency of the spring metal; it being understood that channel 11 is large enough to allow ring 12 to expand sufficiently to admit dome 15 while the opening in retainer 13 and the inside diameter of shank 10 is such that ring 12 is retained in the channel.

Due to the characteristics of ring 12, dome 15 is more firmly held in socket member 5 than is possible with the split dome or split socket construction employed in the snap fasteners now in use and consequently a more substantial union of two articles or parts is possible with the use of my improved fastener.

As dome 15 is but slightly smaller than the interior of shank 10, any attempt to pull stud 7 laterally from socket member 5 will only cause ring 12 to more firmly grip the bottom of groove 16 and will cause dome 15 to contact with one side of the inner wall of shank 10 while the base of the dome is engaged by the flange of cap 13. It is therefore evident that the surfaces of the material, in which socket member 5 and stud 7 are secured, must be moved away from one another in approximately oposite directions, in order to separate the two parts of the fastener.

My improved fasteners may be employed in any capacity in which snap fasteners are ordinarily used but are primarily intended for use in situations where a great deal of strength is required, such as the uniting of straps to articles, thus replacing the buckles, buttons, or hooks that are ordinarily employed for such purposes.

While I have shown a particular construction for carrying my invention into effect, it will be readily understood that modifications may be made and other constructions employed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A snap fastener for securing two pieces of material together including a socket member, a shank formed integral with the socket member and extending through one piece of material, shoulder on the socket member disposed at right angles to the shank and abutting one side of the material, a washer on the shank abutting the other side of the material, an expanded end on the shank, a spring ring in the expanded end, an apertured retainer shaped over the expanded end and abutting the washer, and a dome shaped stud secured to the other piece of material and provided with an annular groove adapted to be engaged by the spring ring for holding the stud in the shank; but slight clearance being provided between the stud and shank whereby it is necessary to move the stud directly away from the socket member in order to remove same therefrom.

2. A snap fastener comprising a socket member and a stud member; the socket member having a cylindrical shank whose side walls are expanded at one end to form a channel, a top formed integral with the other end of the shank, a shoulder formed at the junction of the top and the shank, a washer encircling the shank and adapted to press a piece of material against the shoulders, a spring ring in the channel, and a spring retainer shaped over the expanded end of the shank and overlapping the edge thereof for retaining the ring in the channel and for forcing the washer toward the shoulders; the stud member comprising an inner shell forming a cylindrical body with an annular groove formed therein and having a dome shaped top formed integral with the body, an outer shell fitting over the inner shell and having an annular groove pressed therein and registering with the groove in the inner shell, and flanges formed on the inner and outer shells for securing a piece of material therebetween; the sides of the outer shell having a sliding fit in the shank of the socket member and the spring ring being adapted to enter the groove in the outer shell whereby the socket member may be separated from the stud only by a pull in a direction directly away from the stud.

In testimony whereof I have signed my name to this specification.

GUSTAV A. BENZ.